March 27, 1956  F. G. WILLEY  2,739,865
ELECTRONIC RECORDER
Filed April 27, 1950  3 Sheets-Sheet 1

Inventor
FRANK G. WILLEY
By Mitchell & Bechert
Attorneys

March 27, 1956 F. G. WILLEY 2,739,865
ELECTRONIC RECORDER
Filed April 27, 1950 3 Sheets-Sheet 2

Inventor
FRANK G. WILLEY
By Mitchell & Bechert
Attorneys

March 27, 1956  F. G. WILLEY  2,739,865
ELECTRONIC RECORDER
Filed April 27, 1950  3 Sheets-Sheet 3

Inventor
FRANK G. WILLEY
By Mitchell & Bechert
Attorneys

United States Patent Office 2,739,865
Patented Mar. 27, 1956

2,739,865
ELECTRONIC RECORDER

Frank G. Willey, Roslyn Heights, N. Y., assignor to Servo Corporation of America, New Hyde Park, N. Y., a corporation of New York Application April 27, 1950, Serial No. 158,465

15 Claims. (Cl. 346—33)

My invention relates to recording or the like means, and in particular to means for electrically producing a visible record on suitable recording paper or the like.

It is an object of the invention to provide an improved device of the character indicated.

It is another object to provide improved recorder means wherein there will be no mechanically moving parts except those necessary to advance the recording means and the recording paper or the like relatively to each other.

It is another object to provide improved recorder means having none of the limitations of frequency response common to present-day stylus-type recorders, and which may nevertheless produce an immediately available visible record.

It is a further object to provide a recorder meeting the above objects and yet requiring no dark chamber or developing fluids for producing a permanent visible record.

It is a specific object to provide recording means that may continuously, smoothly, and without lag or inertia effects, permanently record input-signal variations up to 100 cycles per second, with an immediately visible record.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Figure 1:
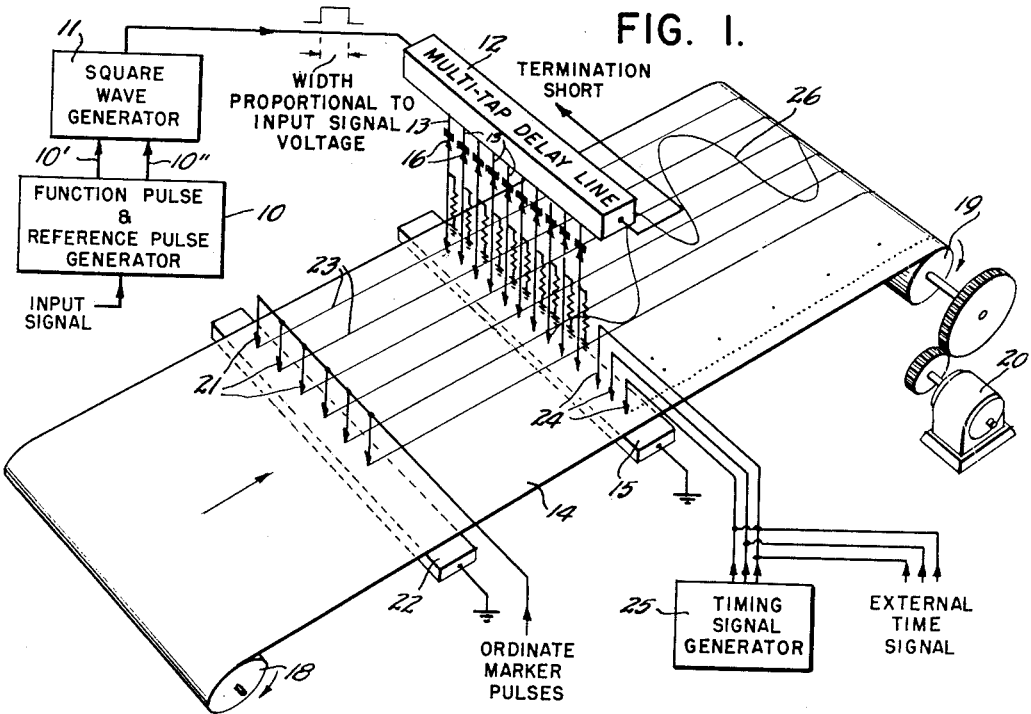
Fig. 1 is an electrical diagram schematically illustrating a recorder incorporating features of the invention.

Briefly stated, my invention contemplates an electronic recorder involving no mechanically moving parts, except those which may be employed to advance the recording paper or the like relatively to the recording head in order to develop a recorded function of time. The invention utilizes the property of a progressive electrical delay means, such as a delay line having a physical length, to transform an electrical signal that is a function of time into an electrical signal that is a function of distance along the length of the delay means; various means may be employed for sensing the signal as a function of distance (along the delay means) at any instant of time, and in a regularly scanning system the sensing means may be operated periodically in accordance with the signal "travel-time" along the delay means. In the forms to be described the sensing means employs a longitudinally extending air gap across which a recording discharge may be made, and the magnitude of the discharge as a function of longitudinal position along the gap may correspond to the instantaneous signal development as a function of distance along the delay means. The invention thus lends itself to facsimile and other recording applications.

The recording means may comprise a head including two cooperating recording members each having mutually facing discharge or electrode portions spaced sufficiently to accommodate therebetween a suitably electrically-responsive recording paper or the like. The discharge or electrode portions may both extend generally longitudinally and may be fixed relatively to each other. One of the recording members may include electric delay-line means effective to progressively delay, along the longitudinal length thereof, the propagation of an electric signal applied at one end thereof. This one recording member may further include at the discharge or electrode portion thereof means for progressively applying along the longitudinal extent of said discharge portion a charge potential representative of the signal as it progresses along the delay-line means; thus at a given instant of time following application of such signal to the delay-line means, a charge potential representative of a part, such as the wavefront, of the signal may first appear at a particular longitudinal location along the discharge or electrode portion.

The amount of charge applied between the discharge portions during a first progression of the signal along the delay-line means is preferably insufficient to induce a response in the recording paper or the like. Such a response may be induced, however, upon the further application of a charge potential between the discharge portions, and this further charge potential may be applied in a number of different ways, some of which form the basis of the several embodiments herein described.

The signal or signals from which both charges are to be derived may be applied to the same end of one of the recording members or to opposite ends of the one recording member; alternatively, these signals may be separately applied to each of the recording members. When separately applied to both recording members, the said other recording member may be either in effect a single electrode electrically common to the full longitudinal extent of the discharge portion associated with the delay-line means, or a second delay-line means may be employed in the said other recording member in a manner analogous to employment of the first-mentioned delay-line means.

As indicated generally above, my invention is of application when it is desired to transform an electric function of time into a recorded function of distance. In facsimile applications the signal applied to one of the recording head members may represent the output of scanning means as it is regularly swept across its field of scan, and means synchronized with the scanning frequency may periodically produce the charge necessary to cause a recording discharge. In the present forms, however, only the recording of relatively simple functions is contemplated; these functions may be converted into time-modulated pulse functions in a preferred application to my recording means.

Referring to Fig. 1 of the drawings, I show schematically how my recording means may be utilized in a system employing what I term a pulse-cancellation method. In this method, an input voltage or other function is repeatedly sampled at relatively short intervals, which may be of the order of 50 microseconds or less. Upon each sampling, a suitable generator 10 may provide in each of two outputs 10′—10″ a function pulse and a reference pulse having a time-spacing proportional to the physical magnitude represented by the input signal. The function pulse and the reference pulse may cooperate to provide a square wave having leading and trailing edges spaced in accordance with the time-spacing between the function pulse and the reference pulse, and I have shown a generator 11 for this purpose; the generator 11 may include a conventional multivibrator and suitable wave-shaping means, and, alternatively, the so-called Miller rundown circuit may be employed.

The square-wave output of generator 11 may be transmitted down a delay line 12 whose far end may be made reflective to oncoming pulses, as by shorting the same in one polarity (for example, positive). Each oncoming square wave will then be reflected at the shorted end of the delay line 12, and the reflected part of the square wave will be of opposite polarity (for example, negative), as compared with the oncoming remainder of the square wave. For each square wave that is reflected, the reflected part of the square wave will cancel the positive forward-going end of the pulse; this will leave only a positive pulse on the line 12 until such time as the returning wave front has traveled past the forward-going trailing edge of the square wave. At this instant, there will appear on the line an effective voltage pulse whose physical spacing relative to the shorted end of the delay line will be a measure of the input voltage or other function at the instant of sampling.

The delay line 12 may form a substantial part of one of two oppositely disposed cooperating recording members; as shown, the delay line 12 includes a plurality of taps 13 in general alignment across suitably responsive recording paper or the like 14, these taps 13 may be provided in sufficient plurality to permit the desired resolution on the recording paper, and it will be appreciated that only a relatively few taps 13 have been shown in the drawing. Collectively, the lower ends of the taps 13 may be said to define the discharge portion of one of the recording members, spaced from and generally aligned with a discharge portion of the other recording member 15, which may be a grounded plate. The grounded plate 15 may be common to a plurality of taps 13, so that any tap 13 may discharge through the recording paper 14 to ground, depending upon the relative time-spacing of the function and reference pulses. In order to separate the negative pulse from any positive pulses existing on the line, a non-linear device may be included in the discharge circuits; in the form shown in Fig. 1 such a non-linear device, as at 16, is included in each of the tap lines 13 from the delay line, and in the form shown in Fig. 2 non-linear means such as a layer 17 of non-linear material applied over the ground plate 15 and facing the paper may provide a rectifying means common to all possible discharge paths.

Figure 2:
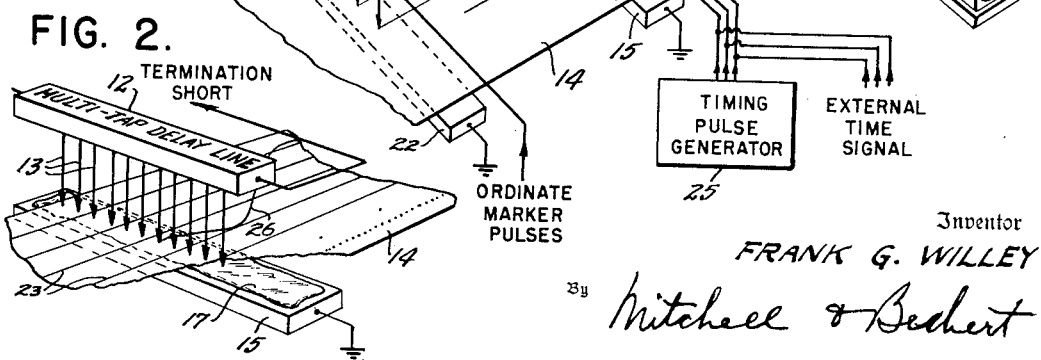
Fig. 2 is a fragmentary perspective view illustrating an alternative part of the recorder of Fig. 1.

Since, in the arrangement of Figs. 1 and 2, it is the reflected wavefront which ultimately effects the recording discharge (i. e. after cessation of cancellation by the oncoming trailing edge), the termination short which constitutes the reflecting means may be viewed as the means for providing the signal which, in cooperation with the original signal, determines the instant or ordinate position of the marking discharge.

Conventional means may be employed for mounting and driving the recording paper 14. The paper 14 is shown as a strip of electro-chemically sensitive material initially wound on a first roll 18, from which it is unwound as it is advanced past the recording means and rewound on the roll 19. A drive motor 20 may provide any desired travel speed for the paper past the recording means.

It will be appreciated that the process of sampling the input signal may be repeated at sufficiently frequent intervals, and that the taps 13 along the delay-line means 12 may be sufficiently closely spaced, to generate a visually solid curve 26 of the input voltage or other function. For the 50-microsecond sampling interval mentioned above, such a visually solid curve may be produced on the recording paper for frequencies up to 100 cycles. It will be understood, furthermore, that there may be virtually no upper limit of recordable frequency as long as it may be acceptable to record the input-voltage sample by means of a series of closely spaced data.

If desired, interpretation of the recorded data may be assisted by the direct application of coordinate markings. Ordinate-marker pulses may be applied to the paper independently of the delay-line marking means, and I have shown a series of parallel-connected styli 21 spaced transversely across the area in which the delay-line record is to be made. Grounding means, such as the plate 22 common to all styli 21, may be supported under the paper and opposite the styli 21. Either or both of the function and reference pulses may be supplied directly to ordinate marker styli 21 in order to produce the ordinate traces 23 shown.

For an abscissa reference, timing impulses may be provided and applied to the recording paper alongside the recorded signal function. For this purpose, I have shown three recording styli 24 to separately receive either externally supplied time signals or timing pulses provided by a generator 25. The timing pulses may be divided in such a way (e. g. decade submultiples) as to make interpretation unambiguous.

Figure 3:
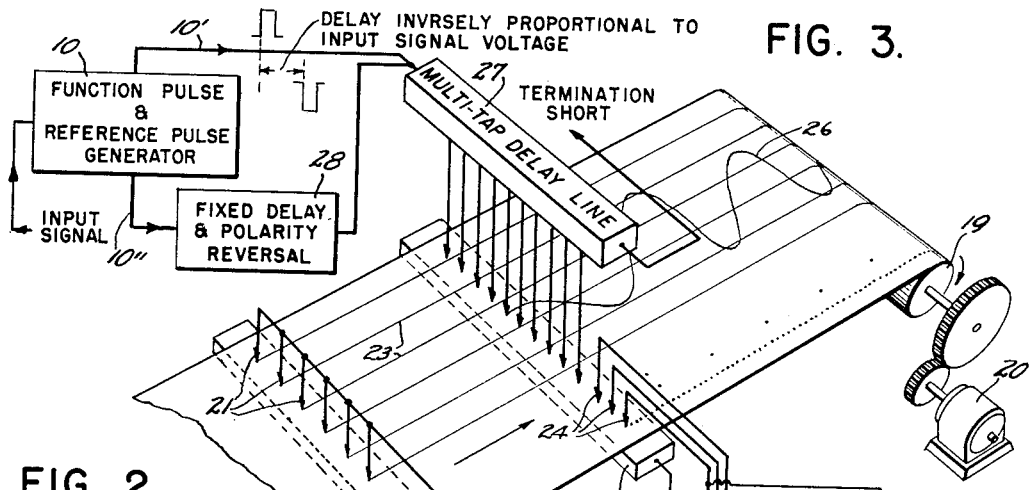
Figs. 3, 4, 5 and 6 are electric diagrams schematically illustrating further embodiments of the invention.

In Fig. 3, I show a slightly modified form of the invention employing what I term a pulse-reinforcement method; in Fig. 3, a multiple-tap delay line 27 may need no non-linear device in order to produce a desired pulse-coincidence recording discharge. The delay line 27 may again be terminated at one end in such a way as to cause reflection of traveling pulses, but in the arrangement of Fig. 3 I separately feed the function pulse and the reference pulse to the other end of the delay line. The reference pulse and the function pulse may be derived from the same generator 10 as employed in Fig. 1, but to the output 10″ thereof in which the reference pulse is available I connect suitable delay means 28, including means for polarity reversal, so that the function and reference pulses may be fed with opposite polarity to the delay line 27. The magnitudes of the function and reference pulses are preferably insufficient of themselves to cause discharge through the recording paper 14, but, when superimposed, the resulting "reinforced" voltage may be sufficient to cause a discharge. Such discharge will not occur while both the function and reference pulses are traveling in the same direction toward the reflecting end of the delay line, but upon reflection of the first pulse there will be a reversal in polarity; thus, when the reflected pulse meets the oncoming unreflected pulse, there may be a superposition of pulses so as to produce a sufficient signal for a discharge.

The fixed delay imposed by means 28 on the reference pulses appearing in the generator-output line 10″ may exceed the maximum period of time-modulation characterizing the function pulses. Thus, for a function pulse characterized by a maximum time-modulated delay, there will be a minimal time-spacing between function and reference pulses, and coincidence with the reflected pulse will occur near the reflecting end of the delay line; for a function pulse characterized by a minimum time-modulated delay, there will be a maximal time-spacing between function and reference pulses, and coincidence with the reflected pulse will occur near the signal-input end of the delay line 27. It will thus be appreciated that the instant of discharge will be characterized by a particular ordinate position on the paper, reflecting the magnitude of the input-signal function.

Figure 4:
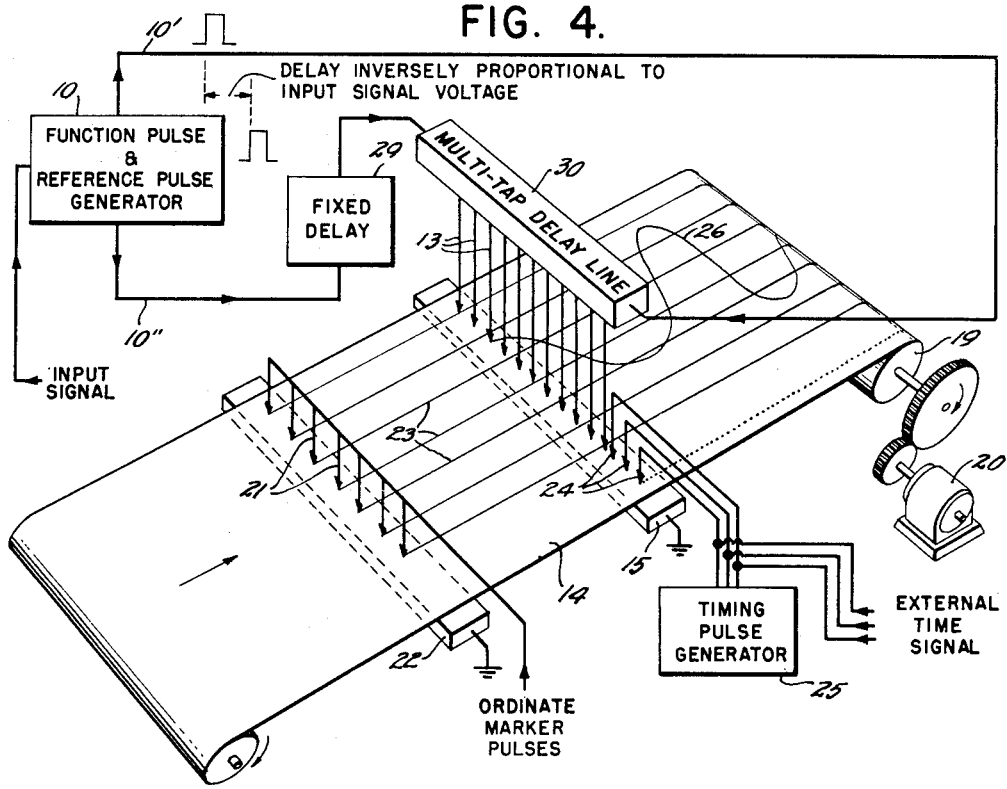

In Fig. 4, I show another recorder arrangement, which may generally resemble that of Fig. 3 and which may also employ the method of pulse reinforcement. In the arrangement of Fig. 4, all the parts may be as previously described, except that no reflecting termination is needed on the multiple-tap delay line 30; to avoid reflections, both ends of the delay line 30 may be fed via impedances matching the characteristic impedance of the delay line 30. As in the case of Fig. 3, means 29 may be employed in the reference-pulse output 10″ of generator 10 for imposing a fixed delay on the reference pulses; this fixed delay may exceed the maximum period of time-modulation characterizing the function pulse, so that the time-spacing between function and reference pulses fed to the delay-line means 30 may be inversely proportional to the magnitude of the input-signal function. The delay means 29 need not effect polarity reversal relatively to the function pulses in line 10′, so that the function and reference pulses may be separately fed with the same polarity to opposite ends of the delay line 30. It will be appreciated, then, that the ordinate position at which pulse-reinforcement and, therefore, a recording discharge occurs will reflect the magnitude of the input-signal function.

Figure 5:
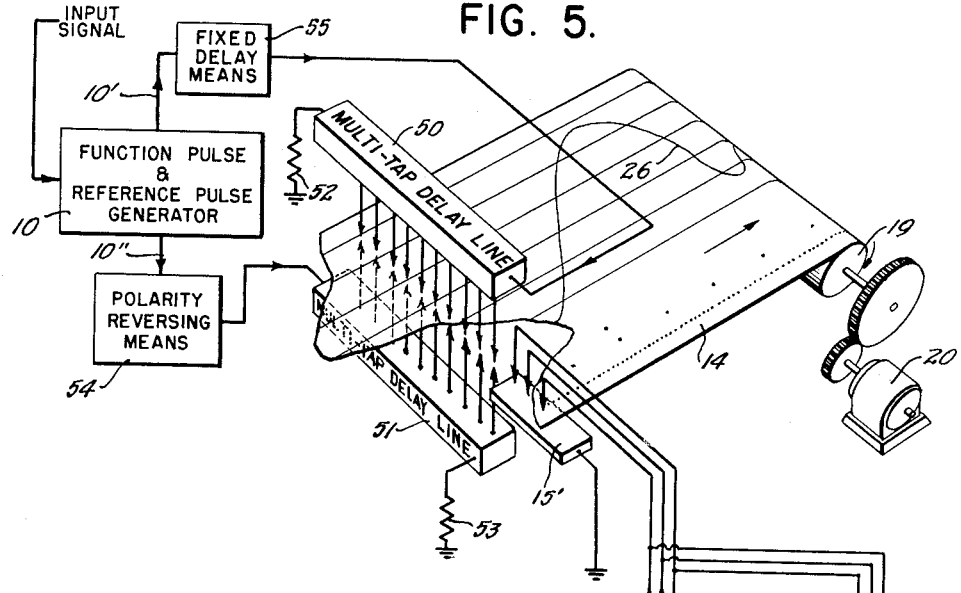
Figure 6:
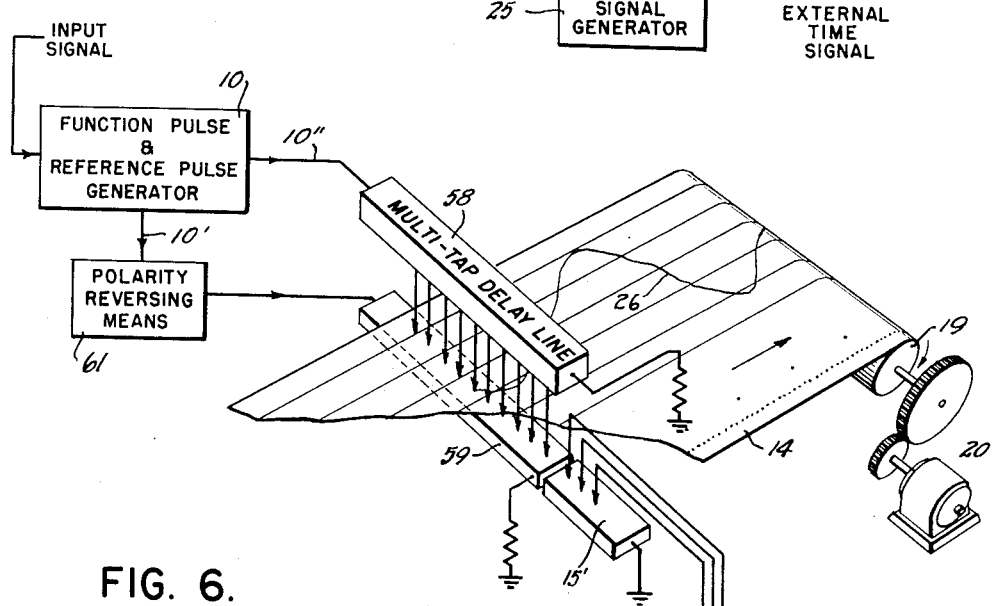

In the forms thus far described, the recording means has included two recording members having oppositely disposed discharge portions; one of these members has included delay-line means, the other has been a grounded plate, and both signals have been applied to the member that includes the delay line. In Figs. 5 and 6, however, I show arrangements in which one signal (e. g. the function pulse) is applied to one recording member while the other signal (e. g. the reference pulse) is applied to the other recording member; in both these latter cases, a recording discharge may occur upon time-coincidence and effective reinforcement of the pulses.

In Fig. 5, both the upper and lower recording members include delay-line means 50—51, which may be terminated by their characteristic impedances 52—53 so as to cause no pulse reflections. The ends thus terminated are opposite ends, so that the function and reference pulses may be fed to the remaining opposite ends of delay lines 50—52. Since the applied signals are placed on both recording members, pulse reinforcement (sufficient to produce a recording discharge) will occur when the function and reference pulses are oppositely poled; I have, therefore, included means 54 in one of the outputs 10′—10″ of generator 10 for effecting the desired polarity reversal. In order that pulse coincidence shall be able to occur over the maximum ordinate extent of the recorder, the reference pulse should be timed to occur at the center of the total possible time-modulation spread of the function pulses, and for this purpose I have included appropriate fixed delay means 55 in one of the outputs 10′—10″.

In Fig. 6, only one of the recording members includes delay-line means (58), while the other recording member may be a plate or electrode 59 common to the multiple-tap discharge means 60 of the one member. As indicated, however, both members may be fed by the outputs 10′—10″ of generator 10. In the form shown, the reference pulses are fed to one end of the delay line 58, which is suitably terminated at the other end so as to cause no reflections; and the function pulses, after being suitably poled at 61, are applied to the other recording member or plate 59. It will be understood that pulse-reinforcement and, therefore, the recording discharge will occur at an instant determined by the instantaneous time-modulation characteristic of the function pulse, and that the ordinate location of such discharge will depend upon the instantaneous positioning of the reference pulse on the delay line 58 at the occurrence of the function pulse.

Figure 7:
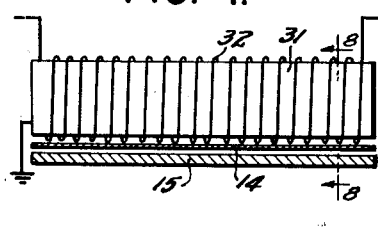
Fig. 7 is a view in elevation of a simplified recording head suitable for use in present embodiments of the invention.
Figure 8:
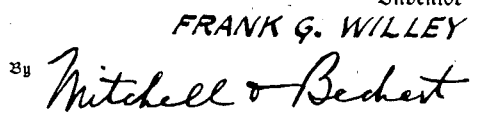
Fig. 8 is a sectional view of the recording head of Fig. 7, taken more or less in the plane 8—8 of Fig. 7.

Delay lines suitable for the above-discussed applications may be of many forms. However, for subdivision into a plurality of tapped outlets for discharge purposes, I have found it convenient to employ a distributed delay line such as a straight helically-wound coil of wire, as shown in Figs. 7 and 8. The core 31 upon which the coil 32 is wound may be of ceramic material, and I prefer that the cross-section be so shaped (as shown in Fig. 8) that the lower part of each turn of the coil 32 is somewhat projected or pointed, as at 33, so as to define something of a point tip, in each turn of the coil, for marking purposes. Thus, the delay line of Figs. 7 and 8 may comprise as many different writing points as there are turns in the coil 32. It will be appreciated that with the use of sufficiently fine wire for the winding 32, and by employment of sufficiently thin insulation (e. g. an enameled coating on the wire 32), the resolution may be extremely fine as between adjacent writing points (it being understood that the enamel coating must be removed from the wire at the point of contact with the electrochemically-sensitive paper); certainly the resolution may be within the resolving power of the electro-chemical paper or the like 14 upon which the writing is done. It will be undestood that by employment of function and reference pulses of effective length or width substantially equal to the time of travel for the pulses around one turn of the winding 32, there may never be any uncertainty as to which turn is doing the writing; with signal pulses thus defined, the limit of the resolving power of a particular writing head may be utilized.

Figure 9:
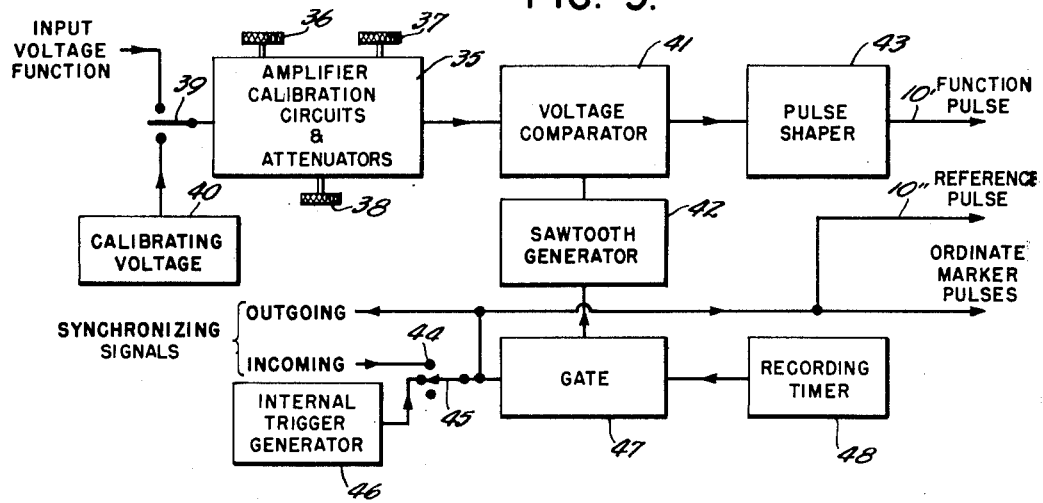
Fig. 9 is a block diagram showing in further detail electrical components suitable for use in operating recorders as presently embodied.

In Fig. 9, I show a suitable equipment to provide function and reference pulses for the various recorders described above. In the equipment of Fig. 9, an amplifier 35 is utilized to accept the input voltage or other function and to shape the same appropriately for accommodation in the pulse-generation end of the equipment. Thus, the amplifier may include provision for separate manual adjustment, as at 36—37—38, of such factors as signal amplification, calibration and attenuation. A manual switch 39 may permit the sampling of a calibrating voltage source 40, for use when manually calibrating the equipment 35 by adjustment of knob 37. The output of amplifier 35 may be fed to a voltage comparator 41, which may generate a time-modulated pulse for each voltage-coincidence between the output of amplifier 35 and the output of a sawtooth generator 42. Such pulse may provide the basis for the function pulse to be utilized as above described and pulse-shaping means 34 may proportion the function pulse as desired, for supply via line 10′ to the various described equipments.

The recorder may be automatically synchronized with pulses or with other identifying characteristics of the function to be recorded, and for such purposes provision may be made for utilization of incoming synchronizing signals, as at the terminal 44. When incoming synchronizing signals are thus utilized, a manual switch 45 may be thrown to the up-position, but in the form shown a local source or generator 46 of synchronizing signals is connected to operate the equipment. The generator 46 may initiate a signal for operating a gate circuit 47, and the gate 47 may determine the timed duration of the sawtooth produced by the generator 42. If desired, a recording timer 48 may be connected to disable the gate (and, therefore, the written record) at the end of a given timed interval, in accordance with known practices. Aside from initiating gate operation, the output of the synchronizing-signal or internal-trigger generator 46 may directly supply the reference pulse utilized in the presently described forms; this signal or reference pulse may also be used to supply the ordinate marking means 21, as will be clear.

It will be appreciated that I have described improved recording means representing a substantial departure from the techniques employed in present-day recorders. My recording means need employ no mechanically moving parts and is not subject to inertia and frequency-response limitations that characterize other recorders. My recorder means may produce an immediately available visible record and requires no special development means in order to make a permanent record. Time-modulated signals of the order of 100 cycles per second may be continuously and smoothly recorded, and the recording head itself may be employed in facsimile applications.

While I have described my invention in detail for the preferred forms shown, it will be understood that modifications may be made within the scope of the invention as defined in the appended claims.

I claim:

1. In a recording device of the character indicated, recording-head means including two cooperating recording members each having oppositely disposed generally longitudinally extending mutually facing discharge portions spaced sufficiently to accommodate therebetween an electrically-responsive paper or the like, an elongated continuous strip of such paper and means for moving the same rectilinearly past said discharge portions, one of said recording members including electric delay-line means effective to progressively delay along the longitudinal length thereof the propagation of an electrical signal applied at one end thereof, said one recording member further including at the discharge portion thereof means for progressively applying along the longitudinal extent of said discharge portion a charge potential representative of the signal as it progresses along said delay-line means, pulse-time-modulator means for effectively energizing said recording-head means at spaced points and including means responsive to an input variable and developing a time-modulated electrical signal having a reference characteristic and a function characteristic time-spaced with respect to each other whereby at a given instant of time following application of such signal to said delay-line means a charge potential representative of a part, such as one of said characteristics, of said signal may first appear at a particular longitudinal location along said discharge portion, and means responsive to the other of said characteristics for establishing a sufficient additional charge potential between said portions to produce an electrical discharge therebetween of a magnitude to which the electrically-responsive paper or the like may respond.

2. A device according to claim 1, in which said charge potential due to said signal is less than sufficient to induce a substantial response of said paper or the like, whereby said paper may not substantially respond until a concurrence of said charges is established.

3. A device according to claim 1, in which said last-defined means includes reflecting means on said delay-line means at a location remote from the end of said delay-line means to which the signal is to be applied, whereby said reflecting means may reverse the polarity of an oncoming characteristic of said signal for retransmission along said delay-line means in the reverse direction.

4. A device according to claim 1, in which said other recording member is at a relatively fixed potential, and in which said last-defined means includes a connection to said one recording member.

5. A device according to claim 4, in which said connection is made to the opposite end of said delay-line means from which said one signal characteristic is applied.

6. A device according to claim 4, in which said one signal characteristic and said connection are both applied at the same end of said delay-line means, whereby both signal characteristics are fed initially at said same end.

7. A device according to claim 1, in which said last-defined means includes a connection to said other recording member, whereby only when there is a time coincidence between a charge developed on said one recording member in response to the signal applied thereto and a charge developed on said other recording member will there be a substantial response of said electrically-responsive paper or the like.

8. A device according to claim 1, in which said other recording member is a generally longitudinally extending grounded electrode.

9. A device according to claim 1, in which said other recording member includes electric delay-line means effective to progressively delay along the longitudinal length thereof the propagation of an electric signal characteristic applied at one end thereof, said other recording member further including at the discharge portion thereof means for progressively applying along the longitudinal extent of said discharge portion a potential representative of a signal characteristic as it progresses along said second delay-line means.

10. A device according to claim 9, in which said second-mentioned delay-line means includes means for receiving the application of said second-mentioned signal characteristic at the end of said second-mentioned delay-line means opposite from the end at which said first signal characteristic is applied to said first delay-line means.

11. A device according to claim 1, in which a plurality of the possible discharge paths between said oppositely disposed discharge portions include non-linear impedance means.

12. A recording system according to claim 11, in which the reference pulses developed by said pulse-time-modulator means are in a relatively fixedly timed relation with the time-modulation cycle of said function pulses, and in which one of said function and reference pulses operates said coordinating means.

13. In a recording device of the character indicated, recording-head means including two cooperating recording-head members with electrical connections thereto and having oppositely disposed generally longitudinally extending mutually facing discharge portions spaced sufficiently to accommodate therebetween an electrically-responsive recording paper or the like, one of said recording-head members including delay-line means with spaced electrically delayed connections thereto; recorder-paper supply and take-up means spaced to allow an intermediate stretch of a roll of recorder paper to be accommodated between said recording-head members; feeding means for continuously feeding the recording paper or the like generally transversely of said recording-head means; pulse-generator means including time-modulating means for energizing said recording-head means, said time-modulating means being responsive to an input variable and developing a time-modulated electrical signal having a reference characteristic and a function characteristic time-spaced with respect to each other, the time-spacing between corresponding of said reference and function characteristics reflecting the instantaneous magnitude of input to said generator means; connection means connecting said generator means to one of said delay-line connections for applying one of said characteristics at said one connection and including a connection effectively applying the other said characteristics to one of the other of said connections, whereby corresponding of said characteristics will travel longitudinally of said recording device and relatively to each other, so that there may be a point of coincidence of said characteristics longitudinally of said recording paper or the like, each such point reflecting longitudinally of said paper or the like the instantaneous magnitude of input to said generator means; and means included in said recording-head means and responsive to such coincidence for establishing a sufficient incremental charge potential between said discharge portions to produce an electrical discharge therebetween of a magnitude to which the electrically-responsive paper or the like may respond.

14. In a device of the character indicated, recording-head means, including oppositely spaced generally longitudinally extending electrode means to accommodate electrically-responsive recording paper or the like in the space between said electrode means, one of said electrode means including a plurality of closely spaced generally longitudinally aligned electrode portions, means for the progressively delayed application of a signal to successive of said electrode portions, recorder-paper supply and take-up means for advancing a continuous strip of recorder paper transversely of said recording-head means and between said electrode means, and a further plurality of longitudinally fixedly spaced electrodes included in one of said electrode means, said last-defined electrodes being directly electrically connected to each other and in generally transverse alignment with the path of movement of the strip of recording paper or the like, whereby signals applied to said further plurality of electrodes may produce ordinate-reference markings on the paper or the like.

15. A device according to claim 13, in which one of said recording-head members includes an abscissa-marking electrode in general longitudinal alignment with said generally longitudinally extending discharge portions, whereby timing pulses or the like applied to said abscissa-marking electrode may be exactly coordinated with a function recorded by said portions.

References Cited in the file of this patent

UNITED STATES PATENTS

| | | |
|---|---|---|
| 2,266,401 | Reeves | Dec. 16, 1941 |
| 2,413,962 | Finch | Jan. 7, 1947 |
| 2,415,229 | Young | Feb. 4, 1947 |
| 2,457,131 | Curtis | Dec. 28, 1948 |
| 2,467,202 | Gardiner | Apr. 12, 1949 |
| 2,485,591 | Grieg | Oct. 25, 1949 |
| 2,501,790 | Silverman | Mar. 28, 1950 |
| 2,561,345 | Deloraine | July 24, 1951 |